United States Patent

Yoshimoto et al.

[11] Patent Number: 5,158,578
[45] Date of Patent: Oct. 27, 1992

[54] PROCESS FOR PREPARING CARBON ELECTRODE

[75] Inventors: Yoshikazu Yoshimoto, Tenri; Hiroshi Wada; Masaru Yoshida, both of Ikoma; Shigeo Nakajima, Nara, all of Japan

[73] Assignee: Sharp Kabushiki Kaisha, Osaka, Japan

[21] Appl. No.: 631,010

[22] Filed: Dec. 19, 1990

[30] Foreign Application Priority Data

Dec. 19, 1989 [JP] Japan .................... 1-329880

[51] Int. Cl.⁵ .................... H01M 6/14; H01M 4/58; C01B 31/04
[52] U.S. Cl. .................... 29/623.5; 423/445; 423/448; 423/460; 427/122; 429/194; 429/218
[58] Field of Search .............. 429/194, 218; 423/445, 423/448, 449, 458, 460; 252/502; 427/122; 29/623.5

[56] References Cited

U.S. PATENT DOCUMENTS

| | | | |
|---|---|---|---|
| 4,702,977 | 10/1987 | Hiratsuka et al. | 429/218 |
| 4,725,422 | 2/1988 | Miyabayashi et al. | 423/445 |
| 4,945,014 | 7/1990 | Miyabayashi et al. | 423/445 |
| 4,978,600 | 12/1990 | Suzuki et al. | 423/448 |

FOREIGN PATENT DOCUMENTS 239410 9/1987 European Pat. Off. .
251677 1/1988 European Pat. Off. .

*Primary Examiner*—Michael Lewis
*Assistant Examiner*—Stephen G. Kalinchak
*Attorney, Agent, or Firm*—David G. Conlin; Robert M. Asher

[57] ABSTRACT

A process for preparing a carbon electrode comprising the steps of subjecting a hydrocarbon to pyrolysis in vapor phase to form a pyrolytic carbon having a specific half-width in X-ray diffractogram, subjecting the pyrolytic carbon to be in lithium vapor to obtain a lithium-intercalated pyrolytic carbon and forming the carbon electrode by utilizing the lithium-intercalated pyrolytic carbon as an electrode material.

13 Claims, 3 Drawing Sheets

PROCESS FOR PREPARING CARBON ELECTRODE

BACKGROUND OF THE INVENTION

1. Field of the Invention

This invention relates to a process for preparing a carbon electrode, and more particularly to a process for preparing a carbon electrode including lithium as a dopant material.

2. Description of the Related Art

Active research has been conducted in order to utilize graphite as an electrode for rechargeable batteries, since it has a layered structure and forms interlayer compounds with various materials. Especially, a graphite electrode as a negative electrode for secondary lithium batteries utilizing an interlayer compound formed with lithium as a dopant is expected to realize a high capacity negative electrode free from dendrite (for example, as disclosed in Japanese Published Unexamined Patent Application No. 208079/1982).

Generally, the following techniques for forming a graphitized interlayer compound by intercalating lithium into natural graphite are known hitherto.

(i) Electrochemical process, and (ii) Vapor phase methods directly contacting lithium vapor with graphites Lithium is, however, not intercalated electrochemically into natural graphite in a non-aqueous electrolyte due to the cause of undesirable side reaction, so that a natural graphite cannot be put into practical use as a negative electrode for secondary lithium batteries utilizing a non-aqueous electrolyte.

Also, the so-called HOPG (Highly-Oriented Pyrolytic Graphite), a high temperature pyrolytic carbon is also used as a material for an electrode in place of natural graphite The HOPG is highly crystalline, so that it is hard to intercalate lithium in accordance with the electrochemical techniques, while a technique for intercalating lithium by the vapor phase process has been practically proposed ("Aspects of alkali metal intercalation and deintercalation in highly oriented pyrolytic graphites" Synthetic Metals, 3(1981) pp. 27–39).

However, when the Li-intercalated HOPG provided by the gas-phase process is used as a negative electrode for lithium batteries utilizing a non-aqueous electrolyte, the electrode itself is disintegrated upon discharge. Hence, it cannot be put into practical use.

In this regard, the inventors of the present invention have already discovered the fact that when a graphitized pyrolytic carbon formed by a low temperature vapor phase pyrolysis of hydrocarbon is used in place of the above natural graphite, it allows the electrochemical intercalation of lithium into the above pyrolytic carbon in non-aqueous electrolyte, and the above pyrolytic carbon is excellent as a negative electrode for secondary lithium batteries (Japanese Published Unexamined Patent Application No. 24555/1988). Furthermore, it has been discovered that the above pyrolytic carbon when deposited on a substrate of an iron family metal exhibits flat and excellent discharge properties (Japanese Published Unexamined Patent Applications Nos. 245855/1988 and 102167/1988). The pyrolytic carbon exhibits good properties in charge and discharge test cycles carried out in a non-aqueous electrolyte.

However, a discharge capacity (mAh/g) of the above pyrolytic carbon negative electrode is smaller than a value calculated from a composition $C_6Li$ of an ideal layered compound formed with lithium and carbon and thereby not satisfactory for practical use.

To be noted is that intercalation of lithium into the pyrolytic carbon in accordance with the vapor phase techniques has not at all been put in use, and the intercalation techniques has been considered to cause the same problem as aforesaid.

SUMMARY OF THE INVENTION

The invention has been designed under the above circumstances. An object of the invention is to provide a carbon electrode having a specially large discharge capacity/density.

According to the present invention, there is provided a process for preparing a carbon electrode comprising the steps of subjecting a hydrocarbon to pyrolysis in vapor phase to form a pyrolytic carbon having 0.1 to 0.7 degree of half-width in X-ray diffractogram, subjecting the pyrolytic carbon to be in lithium vapor to obtain a lithium-intercalated pyrolytic carbon and forming the carbon electrode by utilizing the lithium-intercalated pyrolytic carbon as an electrode material.

The present invention is based on the inventors discovery of the fact that when lithium is intercalated into the above pyrolytic carbon by the vapor phase method, such a carbon electrode is obtained that has a larger discharge capacity/density and shows a superior flatness in discharge curve.

DETAILED DESCRIPTION OF THE PREFERRED EMBODIMENTS

Figure 1:
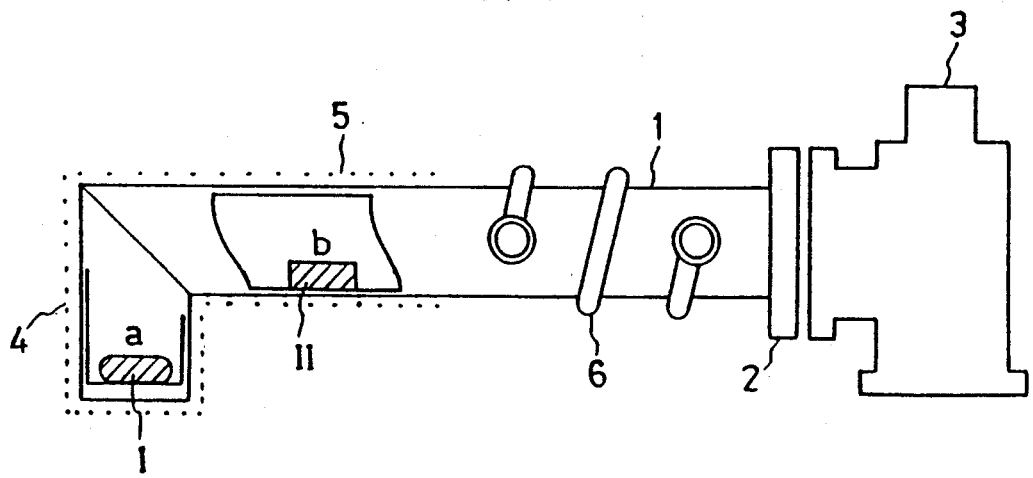
FIG. 1 is a diagram showing an apparatus for vapor intercalation of an example of the present invention.

The hydrocarbon as a material gas to be used in the present invention may be an aliphatic hydrocarbon, an aromatic hydrocarbon, an alicyclic hydrocarbon and the like, which may have at least one substituted group (for example, halogen atom, hydroxyl group, sulfonic group, nitro group, nitroso group, amino group, carboxyl group and the like). Specific examples of the above are methane, ethane, propane, butane, pentane, hexane, cyclohexane, naphthalene, anthracene, pyrene, benzene, toluene, pyridine, allyl benzene, hexamethyl benzene, aniline, phenol, 1.2-dibromoethylene, 2-butyne, acetylene, biphenyl, diphenylacetylene, styrene, acrylonitrile, pyrrole, thiophene and their derivatives.

The pyrolytic carbon of the present invention may be formed on a suitable substrate. The substrate may be made of inorganic substances, such as quartz, sapphire, alumina, SiC, Si and the like, or metals such as copper, platinum, nickel and the like. Particularly, a conductive metal substrate is preferably usable as a current collector. Above all, a substrate made of an iron family metal (iron, cobalt, nickel or the like) or alloys thereof acts as a catalyst and likely facilitates pyrolytic reaction of various hydrocarbon compounds and graphitization of carbon, thereby preferably allowing a particularly notable advantage of the present invention. In this case, the substrate may be in a plate, a foam or net.

The pyrolysis in the present invention is performed by using the above hydrocarbon as a material gas under flow at a low temperature, particularly, lower than 1500° C. The suitable flow rate for supplying the hydrocarbon and suitable values of pyrolytic temperature depend on the kinds of the hydrocarbon applied. It is particularly suitable for the present invention that a hydrocarbon of molecular weight less than 150 be used and the pyrolysis be conducted at 450° to 1300° C., preferably 700° to 1200° C. The remaining conditions for suitably conducting the pyrolysis are as follows.

Supply rate—0.005 to 15 mol/hr (Hydrocarbon)
Molecular concentration—$2 \times 10^{21}$ to $2.6 \times 10^{22}$ molecules/L
Liner flow rate—0.5 to 70 cm/min The formation of a layered (intercalated) compound by contacting lithium vapor to the pyrolytic carbon in the present invention may be effected in accordance with a conventional vapor phase method. It is preferably to use such a technique that the pyrolytic carbon and lithium are placed in a vacuum chamber and are heated at constant temperature to generate lithium vapor to be in contact with the pyrolytic carbon under flow. It is most preferable to perform the process with the pyrolytic carbon and lithium being heated at higher than 400° C.

Next, operation of the electrode of the present invention will be detailed with referring to experimental result.

X-ray diffractometer using $Cu_{K\alpha}$ beam was used to measure a degree of half-width of diffraction peaks in (002) reflection of graphites to evaluate crystallinity of pyrolytic carbon. In the evaluation, the pyrolytic carbon obtained by pyrolysis of hydrocarbon in vapor phase at a temperature of lower than 1500° C. usually exhibited 0.1 to 5.0° of half-width and was judged to be an aggregate of carbons having various crystallinities within the half-width range. The pyrolytic carbon is used as working electrode with using metal lithium for a counter electrode and a reference electrode, respectively, and $LiClO_4$/propylenecarbonate for an electrolyte to perform electrochemical intercalation and deintercalation (corresponding to charge and discharge), so that electric potential upon discharge varies 0 to 2.5 V. Also, a low crystalline pyrolytic carbon which consists of carbons exhibiting 0.7 to 5.0° of half-width is large in a total charge and discharge capacity but its discharge curve is gently-sloping to be inferior in flatness. Further, a high crystalline pyrolytic carbon which consist of carbons exhibiting 0.1 to 0.7° of half-width is superior in flatness of discharge curve but is small in a total discharge capacity including at a high potential part of discharge curve. Also, a higher crystalline pyrolytic carbon consisting of carbons exhibiting 0.1 to 0.3° of half-width does not allow electrochemical intercalation of lithium to the pryolytic carbon and exhibits no charge/discharge capacities. Further, a commercially available highly oriented pyrolytic graphites (HOPG) does not at all accept the electrochemical intercalation.

In detail, the charge and discharge properties highly depend on the crystallinity of the graphitized carbon structure. The discharge property is made excellent with a flat discharge curve as the crystallinity is increased, but lithium tends to be not readily intercalated electrochemically into graphites. Also, when a carbon material having various crystallinities to form pyrolytic carbon contains a high crystalline component which is inactive to electrochemical intercalation, the discharge capacity of the pyrolytic carbon is smaller. On the other hand, a high crystalline component which is not completely inactive to the electrochemical intercalation functions as improving the flatness of discharge curve of the electrode.

It is considered that, according to the present invention, a high crystalline component which may cause a decrease in discharge capacity is activated, resulting in a higher discharge capacity of pyrolytic carbon and an improved flatness of discharge curve.

It is known that a high crystalline graphite such as HOPG (highly oriented pyrolytic graphites) reacts in vapor phase method to obtain a $C_6Li$ interlayer compound. When it is tried to electrochemically deintercalate (corresponding to discharge) lithium from the above interlayer compound in a non-aqueous electrolyte, the graphite is gradually disintegrated to show no discharge capacity. Also, a carbon fiber such as pitch fiber, PAN fiber or the like does not provide an interlayer compound of $C_6Li$ in accordance with vapor phase methods.

On the contrary, according to the present invention, the pyrolytic carbon consisting mainly of $C_6Li$ interlayer compound is produced by vapor phase method and it is possible to electrochemically deintercalate lithium from this interlayer compound into a non-aqueous electrolyte. The discharge capacity upon this deintercalation by the pyrolytic carbon is higher than that by a conventional pyrolytic carbon which is doped with lithium but has been obtained by electrochemical intercalation technique.

The larger the content of a high crystalline component in the pyrolytic carbon is, the higher the increase in the discharge capacity is. For example, a pyrolytic carbon mainly consisting of a high crystalline component with 0.1 to 0.7° half-width increases a discharge capacity about 30% in comparison with the conventional pyrolytic carbon. In the case of a pyrolytic carbon mainly consisting of a low crystalline component with 0.7 to 5.0° half-width, a discharge capacity does not substantially change in comparison with the conventional electrode.

Discharge curves exhibited by both of low and high crystalline pyrolytic carbons in this case are gently stepped and poor in flatness in comparison with the conventional electrode. But, the above stepped shape of discharge curves appears only on an initial de-doping and disappears to be made flat upon repeatedly performed electrochemical intercalation and deintercalation. In addition, an increased discharge capacity in this case is kept irrespective of sequential repetition of the electrochemical intercalation and deintercalation.

In detail, according to the present invention, a specific pyrolytic carbon is contacted or exposed with lithium vapor to form an interlayer compound thereby enabling lithium to be intercalated uniformly into the high crystalline component for which the electrochemical intercalation is hitherto not able to be performed in a non-aqueous electrolyte. Hence, the high crystalline component which is hitherto inactive to the electrochemical intercalation in a non-aqueous electrolyte is activated to increase a capacity of the electrode, and the flatness of the discharge curve increases.

According to the present invention, a high crystalline component in the pyrolytic carbon deposited on the catalytic substrate and placed inwardly near the substrate is also activated. Hence, the present invention is effective particularly for the above pyrolytic carbon deposited on the catalytic substrate. Also, a pyrolytic carbon which contains a much higher crystalline carbon component may enjoy a larger effect.

In use of the electrode of the present invention, it is preferable to utilize as an electrode material the pyrolytic carbon after electrically deintercalated in a non-aqueous electrolyte.

The electrode of the present invention is effectively applicable as a negative electrode for secondary lithium batteries in combination with a positive electrode as a counter electrode and a non-aqueous electrolyte.

The above positive electrode may employ, for example, an oxide such as manganese dioxide, vanadium pentaoxide, chromium trioxide, molybdenum trioxide and the like, a single, mixture or complex of chalcogen compound such as titanium disulfide, tantalum disulfide, tantalum selenide and the like, and an electroconductive high polymer such as polyacetylene, polyaniline and the like.

The electrolyte may use solely or in combination a solution prepared by dissolving, for example, lithium perchlorate, lithium-arsenic hexafluoride, lithium tetrafluoride, lithium-sulfonic trifluoride and the like in water or an organic solvent, for example, propylene carbonate, dimethylsulfoxide, τ-butyrolactone, sulfolane, tetrahydrofuran, 2-methyltetrahydrofuran, 1,2-dimethoxyethane, 1,3-dioxyran and the like.

EXAMPLES

Next, the invention will be further detailed by referring to examples.

EXAMPLE 1

A pyrolytic carbon was deposited on a nickel substrate by using benzene as a material gas in accordance with the chemical vapor deposition (CVD) process under such conditions that the supply rate is 1.5 mol/hr, the molecular concentration is $1.0 \times 10^{22}$ molecules/L, the flow rate is 1.5 cm/min and the pyrolysis temperature is 950° C. The pyrolytic carbon was measured with X-ray diffractometer using $CuK\alpha$ beam and evaluated to have a half-width 0.35° of diffraction peaks in (002) reflection of graphites.

Next, lithium was intercalated into the pyrolytic carbon by using the apparatus for vapor intercalation as shown in FIG. 1.

The apparatus for vapor intercalation of the present example comprises a reactor 1 made from stainless steel. Since lithium has a high reactivity, lithium metal I is put into the part-a through a flange 2 in FIG. 1 and the pyrolytic carbon II into the part-b in an inactive atmosphere such as argon, and a valve 3 is then closed. Thereafter, the reactor 1 is evacuated to $10^{-6}$ Torr through the flange 2 and the valve 3, and the valve 3 is closed again. Ribbon heaters 4 and 5 are wound onto the part-a and -b respectively to control temperature of the part-a and -b separately. Ribbon heater is wound also onto another part of the reactor 1 to properly adjust temperature inside the reactor 1.

In use of the above apparatus, reaction is caused usually at a relatively higher temperature of 400° to 500° C., and the flange 2 and valve 3 are cooled so that their temperature does not exceed 150° C. by use of a water-cooling tube 6. The reaction time necessary for the formation of an interlayer compound of $C_6Li$ composition, which is expected as an active substance for a negative electrode to achieve a maximum discharge capacity, varies depending upon the kind of substrates on which the pyrolytic carbon is to be deposited. Usually, it is sufficient to be 150 to 200 hours for a pyrolytic carbon deposited on an inorganic substance such as quartz and the like, 50 to 150 hours for that deposited on a conductive metal such as copper and the like, and 50 to 100 hours for that deposited on a metal of an iron family having a catalytic property.

In the present example, the reaction was conducted for 90 hours with the portion having the part-a and -b being kept at 400° C., and the peaks corresponding to $C_6Li$ were observed in X-ray diffraction of the pyrolytic carbon after reaction.

Figure 2:
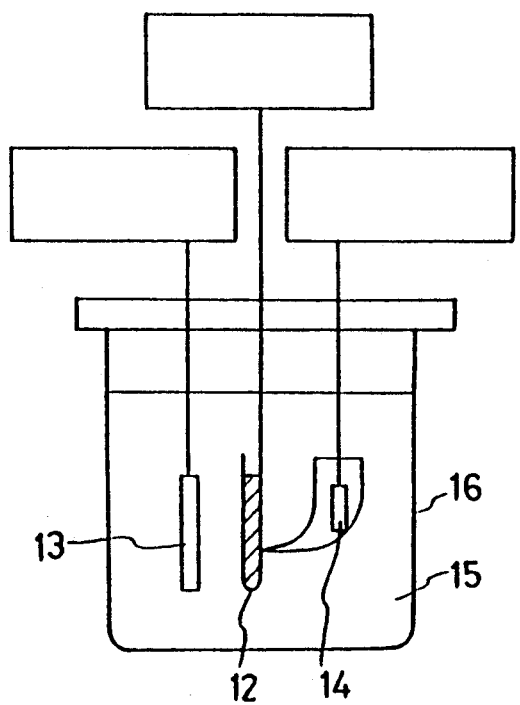
FIG. 2 is a diagram showing a device for measuring charge and discharge properties used in the example.

The pyrolytic carbon obtained is, as an active substance for negative electrode, sandwiched by a collector net to serve as a test electrode A. The test electrode A is arranged in an electrolytic cell as shown in FIG. 2, having a counter electrode of lithium metal to make a discharge test through electrochemical deintercalation of lithium and a charge and discharge test through electrochemical intercalation and deintercalation of lithium. In FIG. 2, indicated at 12 is a test electrode, A13 is lithium metal used as a counter electrode, 14 is lithium metal used as a reference electrode, 15 is an electrolyte consisting of propylene carbonate containing 1 mol of lithium perchlorate, and 16 is an electrolytic cell.

For the purpose of comparison, lithium was electrochemically intercalated into a pyrolytic carbon prepared under the same conditions for the aforesaid CVD process and having 0.35 of half-width. This electrically-intercalated pyrolytic carbon was adapted to serve as a comparison electrode A' and subjected to a discharge test through electrochemical deintercalation of lithium similarly to the test electrode A and also to a charge and discharge test through electrochemical intercalation and deintercalation of lithium.

Figure 3:
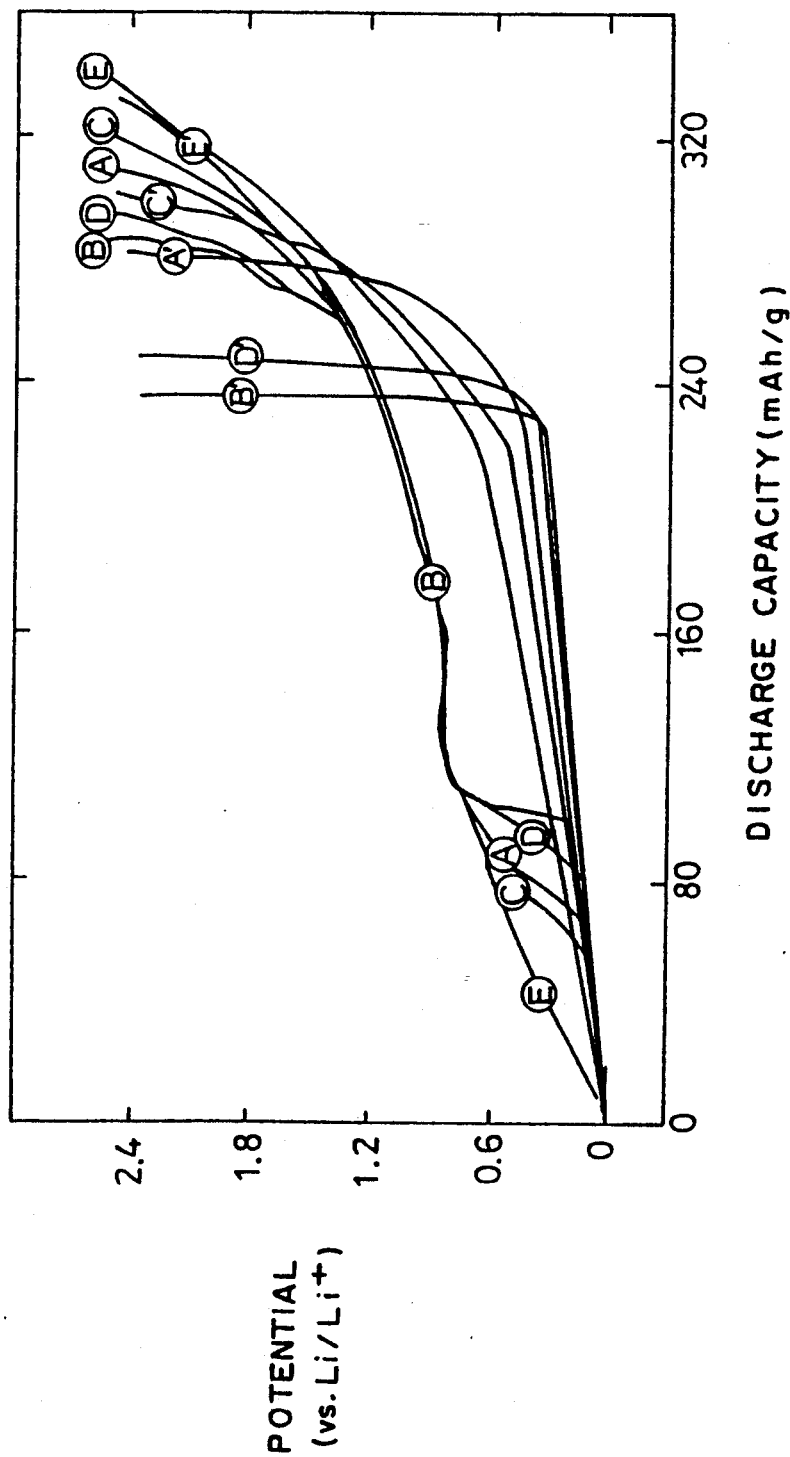
FIG. 3 is a graph showing a discharge curve immediately after the vapor phase intercalation carried out in the present example.

FIG. 3 is a graph showing potential change curves at 25° C. of a test electrode A formed by vapor intercalation of lithium and a comparison electrode A' formed by electrochemical intercalation based on the lithium reference electrode when lithium is electrochemically deintercalated from the test electrode or the comparison electrode A'. The curve A shows potential change of the test electrode A and the curve A'. shows that of the comparing electrode A'. The curve A changes gently and in a stepped manner and a whole discharge capacity was notably improved in comparison with the curve A'.

Figure 4:
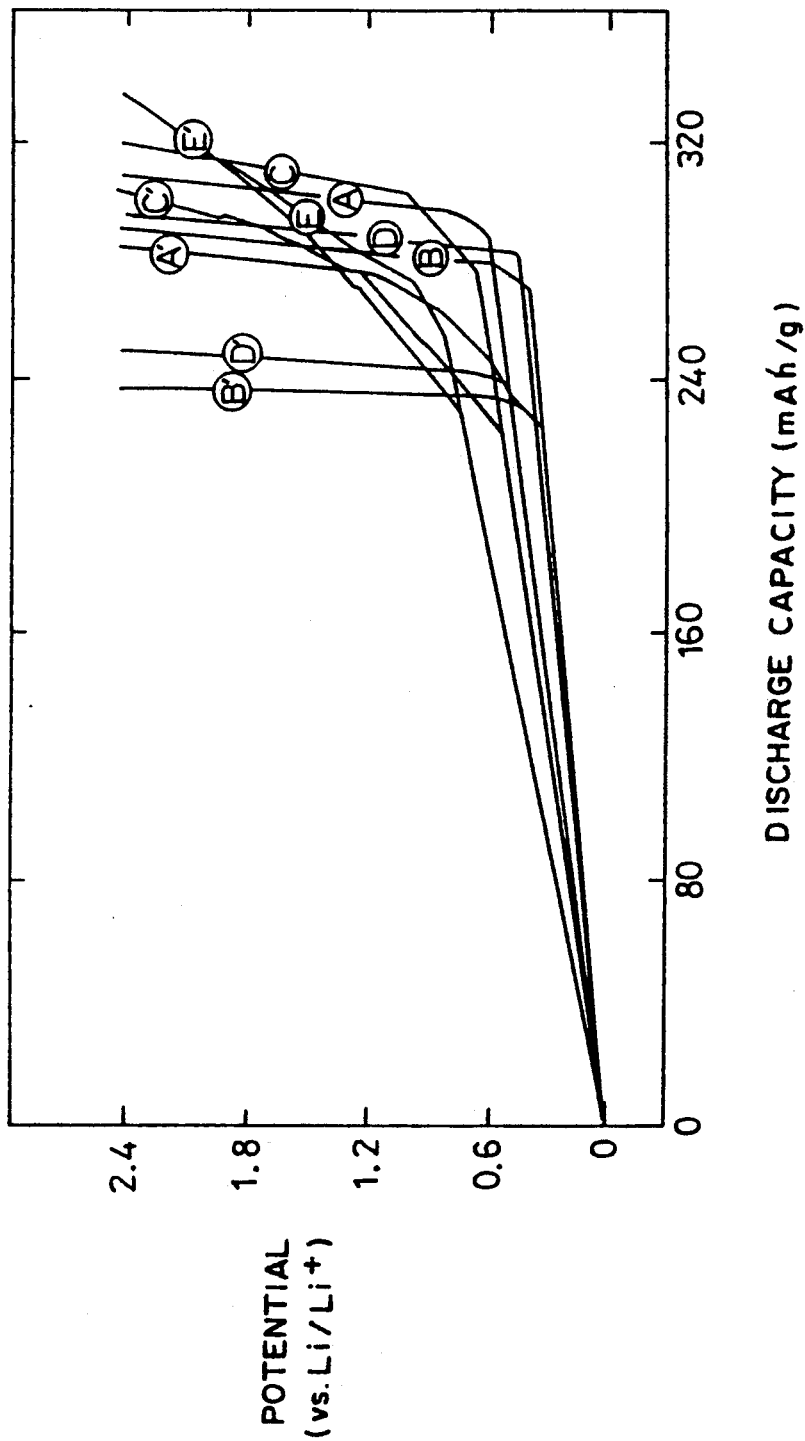
FIG. 4 is a graph showing a discharge curve exhibited at the second time and thereafter by the electrode of the present example.

FIG. 4 is a graph showing potential changes of the test electrode and the comparison electrode based on the lithium reference electrode upon discharge when lithium was electrochemically intercalated into and deintercalated from the test electrode continuously to operation in FIG. 3. The curve A shows potential change of the test electrode A according to the present invention upon discharge through electrochemical deintercalation of lithium after an electrochemical deintercalation and intercalation. Also, the curve A' shows a discharge curve of a comparison electrode in accordance with a conventional technique. The curve A in FIG. 4 does not have any change in the whole discharge capacity with respect to the curve A in FIG. 3 but concerns a notable improvement of discharge capacity in a low potential range lower than about 1 V. In other words, it was observed that the curve A in FIG.

4 was notably improved in the whole discharge capacity and flatness in comparison with the curve A'.

EXAMPLE 2

A pyrolytic carbon was deposited on a nickel substrate using benzene as a material gas in accordance with the chemical vapor deposition (CVD) process similarly with Example 1 except the following CVD process conditions that the supply rate is 1.0 mol/hr, the molecular concentration is $3.0 \times 10^{21}$ molecules/L, the flow rate is 1.5 cm/min and the pyrolysis temperature is 900° C. Crystallinity of the pyrolytic carbon formed as above was evaluated in the same manner as that in Example 1 to find 0.20° of half-width. Test electrode B and comparison electrode B' (electrochemically intercalated) were prepared in the same manner as that in Example 1 except that time for vapor intercalation of lithium into the above pyrolytic carbon was set to 75 hours. A discharge test through electrochemical deintercalation of lithium atom was first carried out and a charge and discharge test through electrochemical intercalation and deintercalation of lithium was then performed to obtain the curves B, B' in FIG. 3 and those B, B'. in FIG. 4. The curves show a notable improvement of the whole discharge capacity and flatness similarly with Example 1, and a higher crystallization than Example 1 to provide a more remarkable effect to that extent.

EXAMPLE 3

Similarly with Example 1 except that propane is used in place of benzene under the following CVD process conditions that the supply rate is 2.2 mol/hr, the molecular concentration is $1.5 \times 10^{22}$ molecules/L, the flow rate is 0.7 cm/min and the pyrolysis temperature is 900° C., and also that time for vapor intercalation of lithium into pyrolytic carbon was set to 100 hours, crystallinity of the pyrolytic carbon formed was evaluated in the same manner as that in Example 1. Also, preparation of a test electrode C and a comparison electrode C' (electrochemically intercalated), a discharge test through electrochemical deintercalation of lithium, and a charge and discharge test through electrochemical intercalation and deintercalation of lithium were performed to find 0.45° of half-width and obtain the curves C, C' in FIG. 3 and those C, C' in FIG. 4. The curves show a notable improvement of the whole discharge capacity and flatness similarly with Example 1, but a lower crystallinity than Example 1 tends to reduce the effect to that extent.

EXAMPLE 4

Similarly with Example 1 except that propane is used in place of benzene under the following CVD process conditions that the supply rate is 1.7 mol/hr, the molecular concentration is $2.5 \times 10^{21}$ molecules/L, the flow rate is 1.5 cm/min and the pyrolysis temperature is 900° C., and also that time for vapor intercalation of lithium into pyrolytic carbon was set to 85 hours, crystallinity of the pyrolytic carbon formed was evaluated in the same manner as that in Example 1. Also, preparation of a test electrode D and a comparison electrode D' (electrochemically intercalated), a discharge test through electrochemical deintercalation of lithium, and a charge and discharge test through electrochemical intercalation and deintercalation of lithium were performed to find 0.25° of half-width and obtain the curves D, D' in FIG. 3 and those D, D' in FIG. 4. The curves show a notable improvement of both of the whole discharge capacity and flatness similarly with Example 1. The pyrolytic carbon used in this example has a higher crystallinity and therefore provides a greater effect than that of Example 1.

EXAMPLE 5

Similarly with Example 1 except that as the substrate was used quartz instead of nickel and time for vapor intercalation of lithium into pyrolytic carbon was set to 200 hours, crystallinity of the pyrolytic carbon formed was evaluated in the same manner as that in Example 1. Also, preparation of a test electrode E and a comparison electrode E' (electrochemically intercalated), a discharge test through electrochemical deintercalation of lithium atom, and a charge and discharge test through electrochemical intercalation and deintercalation of lithium were performed to find 2.5° of half-width and obtain the curves E, E' in FIG. 3 and those E, E' in FIG. 4. The curves do not show a substantial change in both of the whole discharge capacity and flatness while the curve E in FIG. 3 extends more gently than the curve E'.

Noted that the half-width determined by X-ray diffraction shows a mean value regarding all carbon components constituting the pyrolytic carbon to be evaluated. Hence, the degree 2.5 of half-width of the present example does not mean that all of the carbon components of this example consist only of carbon having crystallinity corresponding to the half-width 2.5°. The pyrolytic carbon of this example may include carbons having specific crystallization other than the above degree. This explanation is also applied to the other examples.

In this example, the curves do not show any specific improvement. This may result because the pyrolytic carbon does not substantially contain carbons having crystallinity corresponding to half-width of less than 0.7°, particularly, less than 0.3°.

COMPARATIVE EXAMPLE 1

By using the apparatus as shown in FIG. 1, lithium vapor was generated to contact with pitch carbon fiber and PAN fiber under the conditions similarly with Example 1 and that reaction temperature is set to 400° to 500° C. Reaction was kept for more than 200 hours, but no interlayer compounds of $C_6Li$ was formed.

COMPARATIVE EXAMPLE 2

The Graphitized carbon of 0.05° half-width obtained by a similar CVD process to the above examples was subjected to the vapor intercalation with Lithium to prepare a test electrode F, while a comparison electrode F' (electrochemically intercalated) was also prepared in a similar manner with the examples. A discharge test through electrochemical deintercalation of lithium and a charge and discharge test through electrochemical intercalation and deintercalation of lithium were performed. Vapor intercalation for about 25 hours formed an interlayer compound of $C_6Li$. Likewise, it is generally known that high crystalline graphites such as HOPG (highly oriented pyrolytic graphites) and the like can provide the $C_6Li$ interlayer compound by the reaction for 24 to 50 hours with lithium vapor.

But, in the present case, the test electrode F was gradually disintegrated in the electrolyte of the electrolytic cell upon discharge, and any electrochemical deintercalation of lithium was not able to be performed.

Also, the comparison electrode F' was not able to be prepared since the electrochemical intercalation is not applicable to such a graphitized carbon having high crystallinity as abovesaid.

As seen from the above, the present invention provides an improved carbon electrode in discharge property based on intercalation and deintercalation of lithium with a non-aqueous electrolyte. Thus, the whole discharge capacity of the carbon electrode is remarkably increased and also the discharge capacity at a low potential portion are enhanced. Hence, the invention is preferably applicable to prepare a negative electrode of secondary lithium battery having a large discharge capacity and superior in flatness of the discharge curve, thereby enabling secondary lithium batteries of high performance to be manufactured.

What we claimed is:

1. A process for preparing a carbon electrode which comprises the steps of:

subjecting a hydrocarbon to pyrolysis in vapor phase at a temperature of 1500° C. or below to form a pyrolytic carbon having a graphite structure with a 0.1 to 0.7° half-width diffraction peak in the (002) reflection of graphite;

contacting the pyrolytic carbon with lithium vapor to obtain a lithium-intercalated pyrolytic carbon electrode.

2. The process of claim 1 in which the pyrolytic carbon has 0.1 to 0.3 degree of half-width.

3. The process of claim 1 in which the hydrocarbon is an aliphatic, aromatic or alicyclic hydrocarbon which may be substituted with halogen atom(s) or hydroxyl, sulfonic, nitro, nitroso, amino or carboxyl group(s).

4. The process of claim 1 in which the hydrocarbon has a molecular weight of 150 or less.

5. The process of claim 1 in which the pyrolysis is conducted under a temperature of from 450° C. to 1300° C.

6. The process of claim 1 in which the pyrolysis is conducted under a temperature of from 700° C. to 1200° C.

7. The process of claim 1 in which the intercalation using lithium vapor is conducted under a temperature of 400° C. or higher.

8. The process of claim 1 in which the pyrolytic carbon is prepared on a substrate.

9. The process of claim 8 in which the substrate is made of a metal.

10. The process of claim 8 in which the substrate is made of one of iron, cobalt or nickel, or an alloy thereof.

11. The process of claim 1 in which the carbon electrode is a negative electrode for a non-aqueous secondary battery.

12. A process for preparing a secondary battery comprising the steps of:

subjecting a hydrocarbon to pyrolysis in vapor phase at 1500° C. or below to obtain a pyrolytic carbon having a graphite structure with a 0.1 to 0.7° half-width diffraction peak in the (002) reflection of graphite;

contacting the pyrolytic carbon with lithium vapor to obtain a lithium-intercalated pyrolytic carbon;

electrochemically deintercalating lithium in a non-aqueous electrolyte from the pyrolytic carbon forming the lithium-intercalated pyrolytic carbon; and arranging the resultant pyrolytic carbon as a negative electrode in a secondary lithium battery.

13. A process for preparing a secondary battery comprising the steps of:

subjecting a hydrocarbon to pyrolysis in vapor phase at 1500° C. or below to obtain a pyrolytic carbon having a graphite structure with a 0.1 to 0.7° half-width in the (002) reflection of graphite;

contacting the pyrolytic carbon with lithium vapor to obtain a lithium-intercalated pyrolytic carbon;

arranging the lithium intercalated pyrolytic carbon in a non-aqueous electrolyte to form a secondary battery.

* * * * *